Feb. 19, 1957

C. O. CARLSON 2,782,375

WIDE DEVIATION REACTANCE TUBE MODULATOR CIRCUIT

Filed Nov. 5, 1951

INVENTOR.
C. O. Carlson

BY

ATTORNEY

United States Patent Office 2,782,375

Patented Feb. 19, 1957

2,782,375

WIDE DEVIATION REACTANCE TUBE MODULATOR CIRCUIT

Carl Oscar Carlson, Burbank, Calif., assignor to Bendix Aviation Corporation, North Hollywood, Calif., a corporation of Delaware Application November 5, 1951, Serial No. 254,870

4 Claims. (Cl. 332—28)

This invention relates to reactance tube circuits such as may be used for frequency modulation of an oscillator.

Reactance tube circuits are well-known, but all prior circuits of which I am aware are rather limited as to frequency range, and particularly as to the frequency range over which there is substantial linearity of response. Various attempts have been made to increase the range and linearity, and some improvement has been obtained, but at the price of more complex circuits or the use of extra tubes.

An object of the present invention is to substantially increase the frequency range and linearity of a reactance tube circuit.

Another object is to provide a relatively simple and inexpensive reactance tube circuit having superior characteristics as to frequency range and linearity.

A basic, known, reactance tube circuit of simple form comprises an amplifying tube having its cathode and anode connected across the tank circuit of the oscillator to be controlled, and having its grid connected to a phase-shifting network consisting of a resistance and a capacitor connected in series with each other across the tank circuit. The phase shifting network applies a quadrature voltage component to the grid, producing a quadrature component in the output circuit of the tube which is applied to the tank circuit and has the effect of changing its resonant frequency. By superimposing a signal voltage on the grid, the mutual conductance of the tube is changed to vary the magnitude of the quadrature component fed back to the tank circuit and thereby vary the resonant frequency of the tank circuit in accordance with the signal.

This basic circuit has a limited frequency range, apparently because increase in frequency causes the reactance tube to load the tank circuit in increasing amount, which kills the oscillations. The circuit also has a non-linear relation between the signal variation and resultant frequency variation over its relatively limited range.

The present invention resides essentially in the addition, to the simple circuit described, of a resistor of suitable value inserted in the connection between the anode of the reactance tube and the oscillator tank circuit. When the value of this anode resistor is properly chosen, the frequency range and linearity of response are very greatly increased.

A full understanding of the invention may be had from the following detailed description with reference to the drawing, in which.

Figures 1, 2:
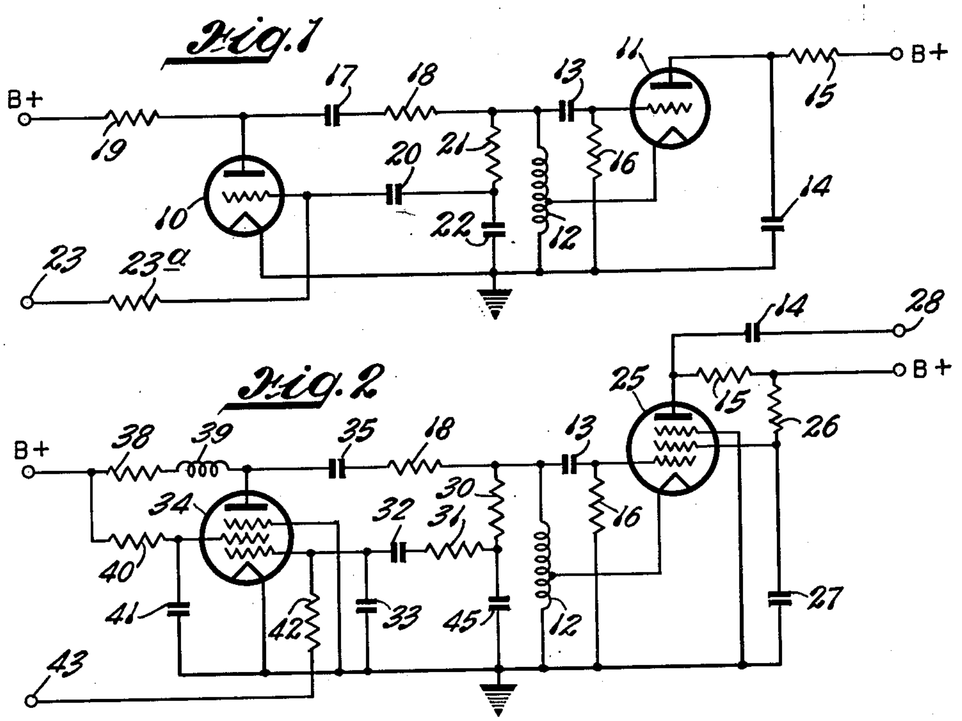
Fig. 1 is a schematic diagram of a simple circuit incorporating the invention.
Fig. 2 is a schematic diagram of a preferred circuit incorporating the invention.

The simple circuit of Fig. 1 comprises a modulator tube 10 and an oscillator tube 11, which tubes are shown as triodes in the interests of simplicity, but in practice might be some other type of tube, particularly the modulator tube 10, which is desirably a pentode of variable-mu type. The oscillator tube 11 is connected in a Hartley oscillator circuit comprising an inductance element 12, the upper end of which is connected through a blocking condenser 13 to the grid of tube 11, and the lower, grounded, end of which is connected through a blocking condenser 14 to the anode of tube 11. A tap on the inductance 12 is connected to the cathode of the tube. The anode may be supplied with direct current potential from a suitable source of B current, through a resistor 15, and the grid of the tube may be connected to ground through a grid leak 16.

The reactance tube 10 has its cathode connected to ground and its anode connected through a blocking condenser 17 and a resistor 18 (the new circuit element of the invention) to the upper end of the inductance 12. The anode may be connected to a B+ source through a resistor 19. The grid of tube 10 is connected through a blocking condenser 20 to the juncture between a resistor 21 and a capacitor 22 connected in series with each other across the inductance 12, the resistor 21 and capacitor 22 constituting a phase-shifting network. A varying negative signal potential may be applied through an isolation resistor 23*a* to the grid of tube 10 from a signal terminal 23.

The circuit of Fig. 1 differs essentially from prior known circuits only in the provision of the resistor 18. It is found by test that when the resistor 18 is added, the circuit has a very wide frequency range as compared to the conventional circuit, and the relation between the signal potential applied to the lead 23 and the frequency is substantially linear over the major portion of the frequency range.

A more practical circuit is shown in Fig. 2, in which the phase-shifting network consists of two resistors and two condensers for providing a phase shift of exactly 90° at the center frequency of the range under consideration.

In Fig. 2 the oscillator tube 25 is a pentode having, in addition to its cathode, control grid and anode, a screen grid energized from the B+ supply through a resistor 26 and grounded through a bypass condenser 27, and a suppressor grid, which is grounded. As in Fig. 1, the cathode of the oscillator tube is connected to the tap on the tank circuit inductance 12; the anode is connected to an output terminal 28 through a blocking condenser 14, and through a current-supply resistor 15 to the B+ supply. The control grid is connected through the blocking condenser 13 to the upper end of the tank inductance 12 and is connected to ground through the grid leak 16.

In Fig. 2, the phase-shifting network comprises a resistor 30, a resistor 31, a capacitor 45, a blocking capacitor 32, and a capacitor 33. This network is connected in shunt to the tank inductance 12. The potential across the last capacitor 33 is applied to the control grid of the modulator tube 34, the cathode of this tube being connected to ground, and the anode connected through the blocking condenser 35 and the resistor 18 to the upper end of the tank inductance 12. The anode is energized from the B supply through a resistor 38 and an inductance or choke 39. As shown, tube 34 is a pentode having its suppressor grid grounded and its screen grid energized from the B+ supply through a resistor 40, in the usual manner, with a by-pass condenser 41. The control grid of tube 34 is connected through an isolating resistor 42 to the signal input terminal 43.

When the circuit of Fig. 2 is intended to operate over the frequency range from approximately 6 to 11 megacycles, the circuit elements may have the following values:

| | | |
|---|---|---|
| Tube 25 | | 6AU6 |
| Tube 44 | | 6AH6 |
| Capacitor 14 | mmf | 33 |
| Capacitor 27 | mmf | 150 |
| Capacitor 13 | mmf | 56 |
| Capacitor 35 | mmf | 470 |
| Capacitor 41 | mmf | 330 |
| Capacitor 32 | mmf | 680 |
| Capacitor 33 | mmf | 43 |
| Capacitor 45 | mmf | 6 |
| B+ potential | volts | 300 |
| Resistor 15 | ohms | 3,500 |
| Resistor 26 | do | 4,700 |
| Resistor 16 | do | 47,000 |
| Resistor 18 | do | 1,500 |
| Resistor 30 | do | 820 |
| Resistor 31 | do | 820 |
| Resistor 42 | do | 200,000 |
| Resistor 40 | do | 68,000 |
| Resistor 38 | do | 3,300 |
| Choke 39 | mh | 2.5 |

The tank inductance 12 may have a diameter of .75 inch and 40 turns of No. 28 wire tapped at 11 turns from the bottom.

Figure 3:
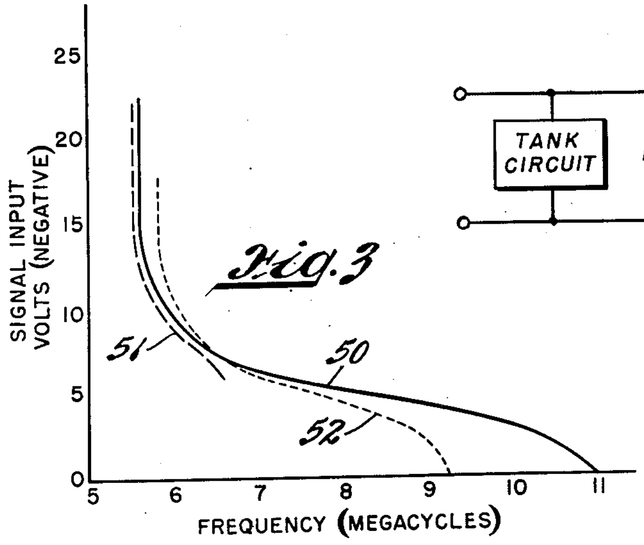
Fig. 3 is a graph showing the variation of frequency with signal in the circuit of Fig. 2.

The variation in frequency of the oscillator 25 with variation in negative potential on the grid of the reactance tube 34, when the circuit has the constants set forth above, is shown by curve 50 in Fig. 3. It will be observed that this curve covers a range from approximately 5.8 megacycles to 11 megacycles, and that it is substantially straight throughout the major portion of this range. If the resistor 18 is eliminated, i. e. its resistance reduced to zero, as in prior circuits, the characteristic is shown by curve 51 in Fig. 3. In this instance it will be observed that the range of oscillations is only from approximately 5.8 to 6.5 megacycles, oscillations ceasing when the negative grid voltage was reduced to approximately 7 volts. The characteristics of the circuit when the value of resistor 18 is doubled from 1500 to 3000 ohms, is shown by curve 52 in Fig. 3. With this higher value, the circuit oscillated over the entire range of negative signal input potentials, but the frequency range extended only from about 5.9 to 9.2 megacycles, and the linear portion was substantially less than that. Tests indicate that in the particular circuit of Fig. 2 the widest frequency range and most linear response is obtained when the resistor 18 is approximately equal to twice the resistance of the resistor 30 or the resistor 31, these latter two resistors being equal in value. However, the resistor 18 can depart greatly from the optimum value and still give superior results as compared to prior known circuits.

Figure 4:
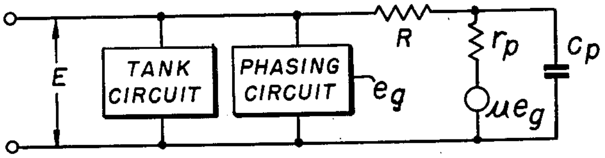
Figs. 4 and 5 are diagrams showing theoretical circuits useful in analyzing the operating of the circuits of Figs. 1 and 2.

For the purpose of analysis, the circuit can be reduced to the schematic form shown in Fig. 4, in which the oscillator tube is represented as a source of potential E connected in shunt to the tank circuit and the phasing circuit. The reactance tube is represented as a source of potential $\mu e_g$ in series with a resistance $r_p$ and a capacity $C_p$. The reactance tube is connected across the phasing circuit through the resistance R, which is the new element introduced in accordance with the present invention.

The phasing circuit serves only to produce a negative quadrature grid potential $e_g$ for application to the grid of the reactance tube, which is represented by the expression:

$$e_g=-j\frac{K}{\omega}E \qquad (1)$$

where K is substantially a constant.

Figure 5:
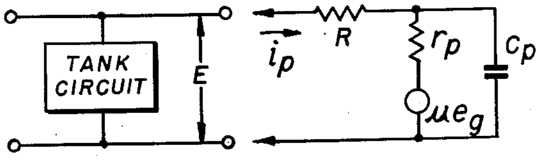

For present purposes, the phasing circuit can be regarded as a part of the tank circuit, and the circuit of Fig. 4 reduced to that of Fig. 5.

In Fig. 5, at any frequency represented by $\omega$, the expression for the current $i_p$ is:

$$i_p=\frac{E}{R+\frac{1}{j\omega C_p}}+\frac{g_m e_g}{1+R^2\omega^2C_p^2}-j\frac{g_m e_g R\omega C_p}{1+R^2\omega^2C_p^2} \qquad (2)$$

Where $g_m$ is the mutual conductance of the reactance tube. Substituting the value for $e_g$ given in Expression 1 into Expression 2 gives:

$$i_p=\underset{(a)}{\frac{E}{R+\frac{1}{j\omega C_p}}}-\underset{(b)}{\frac{g_m ERC_pK}{1+R^2\omega^2C_p^2}}-j\underset{(c)}{\frac{g_m EK}{\omega(1+R^2\omega^2C_p^2)}} \qquad (3)$$

In Expression 3 term (*b*) disappears when R is zero (as it is in prior circuits), and the real component of the current $i_p$ is then determined solely by term (*a*), which increases with frequency and loads the oscillator, thereby limiting its frequency range.

However, when R is not zero, term (*b*), representing negative resistance, is present. Term (*b*) contains $g_m$ in the numerator and $g_m$ is increased (by reduction of the negative bias on the reactance tube grid) to raise the frequency. $\omega^2$ appearing in the denominator tends to reduce the value of term (*b*), but in practice $C_p$ is so small that the product $R^2\omega^2C_p^2$ is much less than unity. Therefore term (*b*) increases with frequency, and, since it is negative, opposes the loading effect of term (*a*). This accounts for the extension of the frequency range produced by the insertion of R (resistor 18 in Figs. 1 and 2).

It is to be noted that the phasing circuit was so chosen that $e_g$ is negative, which it would be with the circuits of Figs. 1 and 2. If a phase-shifting circuit producing a grid voltage $e_g$ of positive sign were employed, term (*b*) of Expression 3 would be positive, and the addition of the resistance R would reduce the frequency range of the system instead of increasing it.

Term (*a*) shows that the loading of the oscillator increases with $C_p$ and decreases with an increase in R, and term (*b*) shows that the compensating effect increases with the product $RC_p$. It is therefore desirable to keep $C_p$ low relative to R. This is done by choosing a reactance tube of low internal capacity.

The term (*c*) represents the quadrature current component of the output of the reactance tube that is effective in controlling the frequency of the source E (the oscillator). It is not materially affected by the presence or absence of R so long as $C_p$ is kept small.

In setting up the circuit of Fig. 2 the capacitor 45 is desirably chosen only slightly larger than the stray capacity at that point, and capacitor 33 is chosen approximately ten times the value of capacitor 45. The value of each resistor 30 and 31 can then be determined from the formula $$R=\frac{1}{\omega_0\sqrt{C_1C_2}}$$

where $\omega_0$ is the center frequency desired and $C_1$ and $C_2$ are the capacities of capacitors 45 and 33. Resistor 18 can be initially chosen twice the value of resistor 30 or 31. Slight adjustments in frequency can be made by varying the capacities of capacitors 45 and 33 while keeping their product constant, after which the resistor 18 is varied until the optimum frequency range is obtained.

Although for purposes of explanation of the invention two specific circuits (Figs. 1 and 2) have been disclosed, it is not limited to those specific circuits but has general application to reactance tube modulators in which the quadrature current output of the reactance tube is negative. Various other modifications will be obvious to those skilled in the art, and I do not desire to be limited to the exact details shown and described.

I claim:

1. A variable frequency oscillator circuit comprising: an oscillator having a tuned frequency-determining circuit;

a variable gain amplifier having input terminals and output terminals and having small but finite capacity between its output terminals; means for varying the gain of said amplifier; input means connected to said amplifier input terminals for applying thereto a potential of such phase as to produce between said output terminals an output current substantially in positive phase quadrature with respect to the potential of said tuned circuit; and means connecting said output terminals to said tuned circuit and including resistance means in series between said output terminals and said tuned circuit, said resistance means being of such magnitude as to appreciably retard the phase of said output current; whereby the current delivered from the output terminals of said amplifier to said tuned circuit has a positive quadrature component and a negative resistance component, both of which vary directly with the gain of said amplifier to increase the frequency of said oscillations and simultaneously increase the negative resistance inserted into said tuned circuit in response to an increase in the gain of said amplifier.

2. A circuit according to claim 1 in which said amplifier comprises a vacuum tube having a cathode, grid, and anode, the cathode and anode being connected to said output terminals, and the inherent capacity between said cathode and anode constituting said small but finite capacity.

3. A circuit according to claim 2 in which said cathode and grid are connected to said input terminals, and said input means comprises a phase-shifting network connected to said tuned circuit for deriving therefrom and applying to said input terminals a negative quadrature potential.

4. A circuit according to claim 1, in which said input means comprises a phase-shifting network having series resistance elements and shunt capacity elements and said resistance means has resistance of approximately the same magnitude as the sum of said series resistance elements.

References Cited in the file of this patent

UNITED STATES PATENTS

| | | |
|---|---|---|
| 2,265,016 | White | Dec. 2, 1941 |
| 2,324,282 | Crosby | July 13, 1943 |
| 2,491,590 | Sorensen | Dec. 20, 1949 |